(12) United States Patent
Beristain et al.

(10) Patent No.: US 10,809,389 B2
(45) Date of Patent: Oct. 20, 2020

(54) METHOD AND APPARATUS FOR LOCATION TRACKING AND SHARING OF SOCIAL MEDIA DATA

(71) Applicant: Festiie, Inc., Los Angeles, CA (US)

(72) Inventors: Desmond Anthony Beristain, Los Angeles, CA (US); Daniel Neema Salehi, Los Angeles, CA (US)

(73) Assignee: FESTIIE, INC., Los Angeles, CA (US)

( * ) Notice: Subject to any disclaimer, the term of this patent is extended or adjusted under 35 U.S.C. 154(b) by 76 days.

(21) Appl. No.: 16/006,667

(22) Filed: Jun. 12, 2018

(65) Prior Publication Data

US 2018/0356533 A1 Dec. 13, 2018

Related U.S. Application Data

(60) Provisional application No. 62/518,366, filed on Jun. 12, 2017.

(51) Int. Cl.
| | |
|---|---|
| *G01S 19/46* | (2010.01) |
| *G01C 21/36* | (2006.01) |
| *H04W 4/02* | (2018.01) |
| *G01S 19/14* | (2010.01) |
| *H04W 4/80* | (2018.01) |

(52) U.S. Cl.
CPC .......... *G01S 19/46* (2013.01); *G01C 21/3664* (2013.01); *G01S 19/14* (2013.01); *H04W 4/023* (2013.01); *H04W 4/80* (2018.02)

(58) Field of Classification Search
CPC ........ G01S 19/46; G01S 19/14; H04W 4/023; H04W 4/80; G01C 21/3664
See application file for complete search history.

(56) References Cited

U.S. PATENT DOCUMENTS

| | | | |
|---|---|---|---|
| 9,892,610 B1* | 2/2018 | Lange | G08B 21/0266 |
| 9,947,210 B2* | 4/2018 | de Barros Chapiewski | |
| | | | H04W 4/029 |
| 10,460,584 B1* | 10/2019 | Lange | G08B 21/0247 |
| 2017/0361132 A1* | 12/2017 | Dykes | A62B 9/006 |
| 2018/0052004 A1* | 2/2018 | Friedlander | G06F 1/163 |
| 2018/0211198 A1* | 7/2018 | Makhoul | H04W 28/06 |
| 2018/0268670 A1* | 9/2018 | Gabbay | G09B 21/003 |

* cited by examiner

*Primary Examiner* — Thomas Ingram
(74) *Attorney, Agent, or Firm* — Cotman IP Law Group

(57) ABSTRACT

A system for location tracking and sharing of social media data are presented. The system comprises a smart tracking device with a housing. The housing has a plurality of directional windows. At least one light source, e.g. LED, is configured for each of the plurality of directional windows. The directional windows provide compass type guidance, e.g. North, Northeast, East, etc. A GPS transceiver provides local GPS coordinates of the tracker. A private network transceiver is included for communicating with one or more other tracking devices to exchange GPS coordinates information. A microcontroller uses the GPS coordinates of the local tracker and the one or more other tracking devices to compute directional guidance, i.e. navigational, using the plurality of LED light sources to a selected one of one of the one or more other tracking devices. A radio transceiver, e.g. BLE, is provided for communication with a smart device, e.g. smartphone.

20 Claims, 12 Drawing Sheets

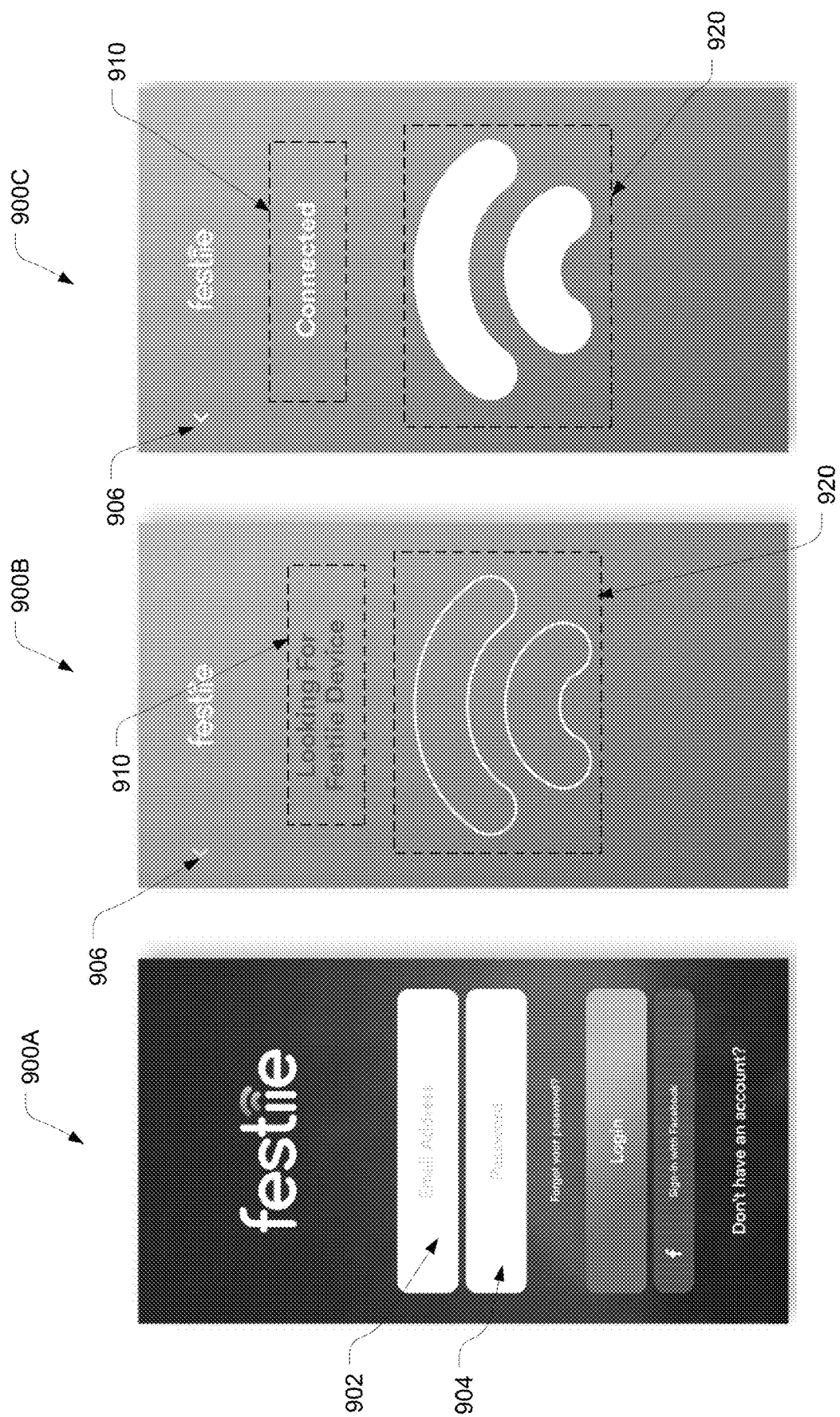

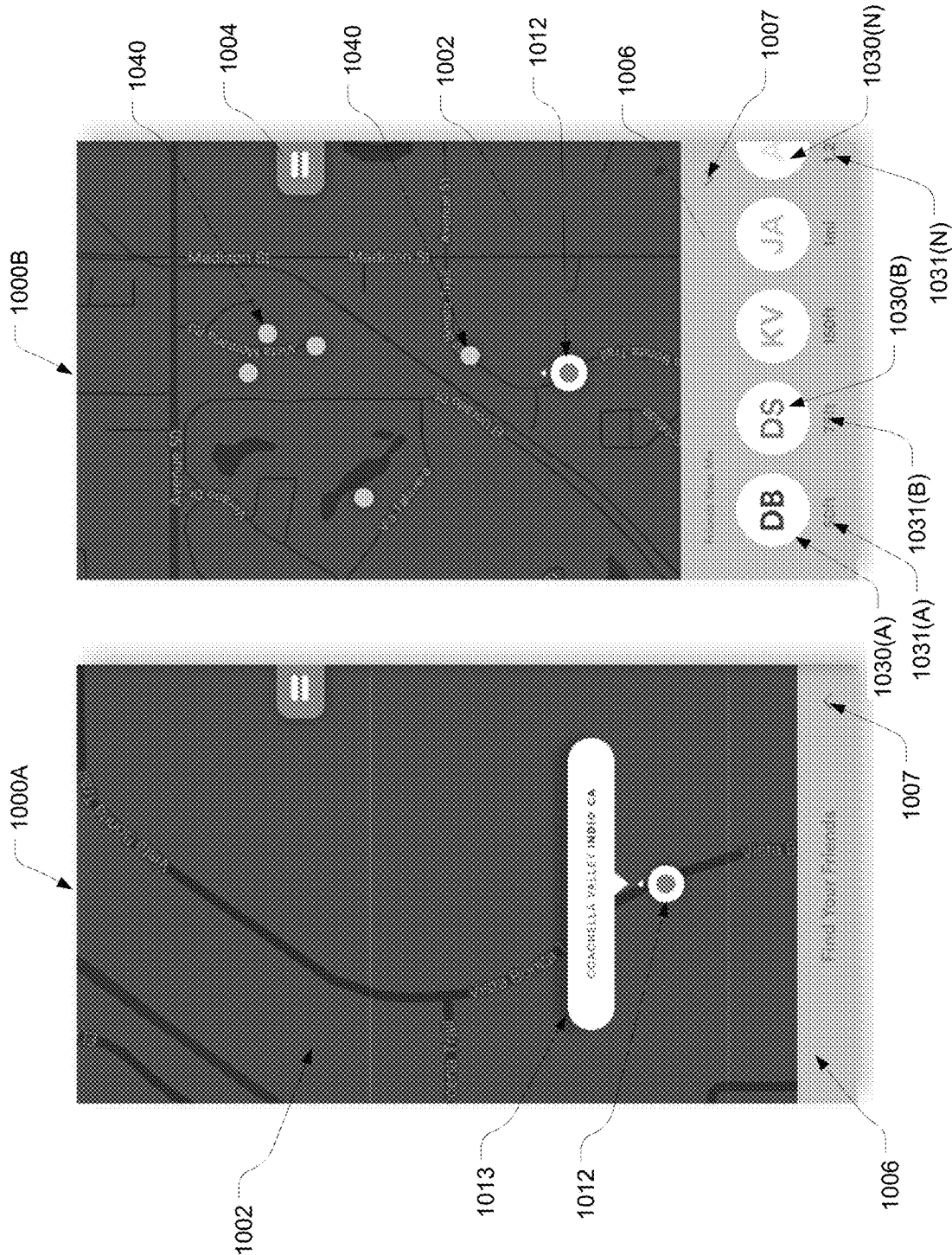

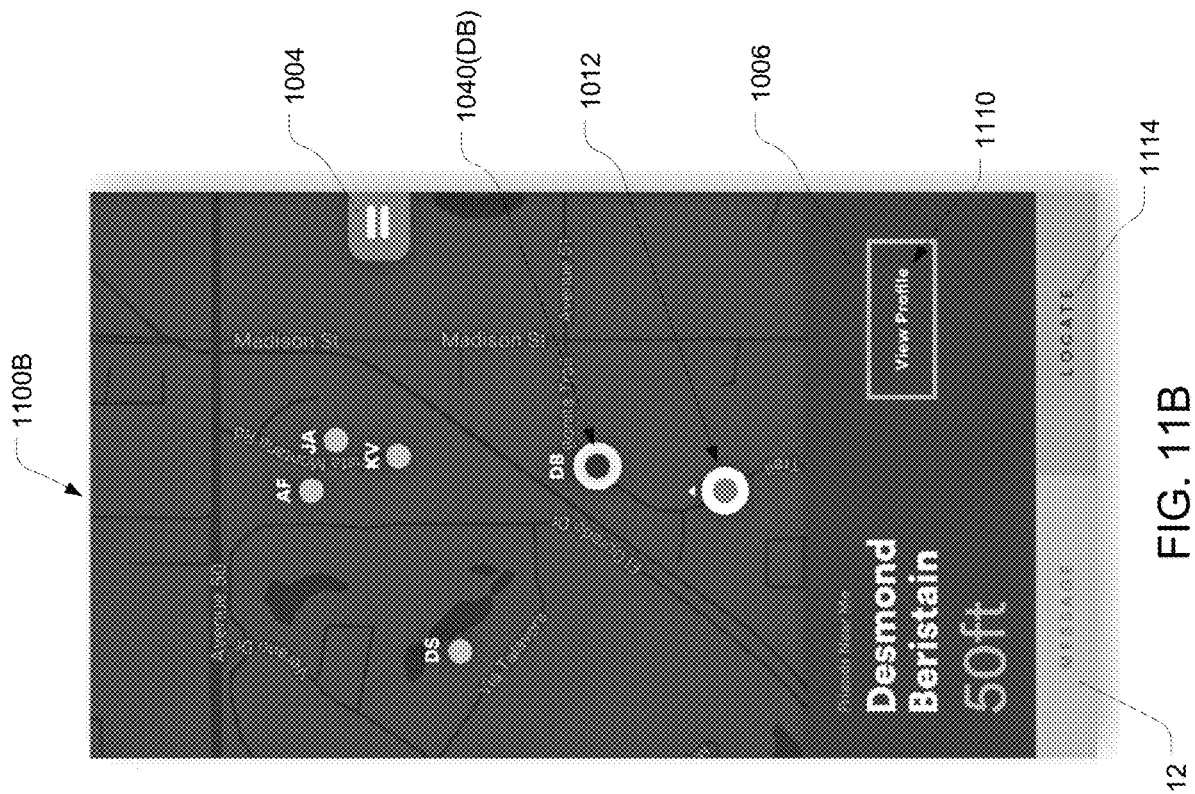
FIG. 11A
FIG. 11B

METHOD AND APPARATUS FOR LOCATION TRACKING AND SHARING OF SOCIAL MEDIA DATA

CROSS-REFERENCE TO RELATED APPLICATIONS

The present application claims the benefit of U.S. Provisional Application Ser. No. 62/518,366, filed on Jun. 12, 2017, which is herein incorporated by reference for completeness of disclosure.

BACKGROUND OF THE INVENTION

Field of the Invention

Embodiments of the invention relates to the field of social networking. More specifically, the invention relates to a method and apparatus for location tracking and sharing of social media data.

Description of the Related Art

There are currently no known systems that provide the exact location of where your friends or family are at a largely populated event, e.g. music festivals.

Prior art devices use a cellular network and become ineffective once the user's phone dies. Location sharing on these prior art devices is not live, which means that you have to wait for the other member to send their location as opposed to knowing exactly where they are at the press of a button. With the prior art devices, a user is not readily able to reconnect with new friends from such populated events.

To overcome the problems and limitations described above there is a need for a wearable device for location tracking and sharing of social media data that can work independently from the user's phone so that even if the phone dies, the user is still able to find group members, be found, and connect with new friends. The invention has an extended range, can work independently (no phone needed), and is much easier to wear (lightweight wearable).

BRIEF SUMMARY OF THE INVENTION

One or more embodiments of the invention are directed a wearable smart band for location tracking and sharing of social media data. The invention relates to a wearable tracking device or smart band that can be used by a group of persons, e.g. friends and/or family, at a crowded event, e.g. a music festival/crowded event/theme park, to track each other's location thereby never losing each other even in places where there is no cell connection. For example, if a user would like to be found they are able to use the invention's "Find Me" feature to alert friends or family that they would like to be found. In one or more embodiments, the "Find Me" feature may be activated simply by turning on the device. A user that does not have a smart device, e.g. a smartphone or tablet, can still utilize the smart band with its compass to direct them to their friends and family.

The system comprises a tracking device with a housing. The housing has a plurality of directional windows with at least one light source, e.g. LED, configured for each of the plurality of directional windows. The directional windows provide compass type guidance, e.g. North, Northeast, East, etc.

One or more embodiments of the tracker comprises a GPS transceiver that provides the local GPS coordinates of the tracker. The tracker further includes a private network transceiver for communicating with one or more other trackers in a private network to exchange GPS coordinates information. In one or more embodiments, the private network uses the LoRaWAN protocol to communicate to other tracker devices within a certain radius. For example, the system was tested to operate within about a one-mile radius.

One or more embodiments of the invention further includes a microcontroller that uses the GPS coordinates of the local tracker and the one or more other trackers to compute directional guidance, i.e. navigational, using the plurality of LED light sources to a selected one of one of the one or more other trackers.

One or more embodiments of the invention further includes a radio transceiver, e.g. BLE, for communication with a smart device, e.g. smartphone or tablet computer.

One or more embodiments of the invention further comprises a master controller. The master controller comprises an application software implemented in the smart device. In addition to other functions, the master controller is configured to provide graphical navigational guidance to said one or more other trackers.

In one or more embodiments, a user can connect with new friends at a festival, theme parks, leisure parks, cruises, crowded events, etc. simply by touching of smart bands (i.e. trackers) together to transfer contact data and/or to establish social media connection.

BRIEF DESCRIPTION OF THE DRAWINGS

The above and other aspects, features and advantages of the invention will be more apparent from the following more particular description thereof, presented in conjunction with the following drawings wherein:

FIGS. 9A-C are illustrations of a login user interface of an app for the wearable tracking device in accordance with one or more embodiments of the present invention.

FIGS. 10A-B are illustrations of location identification graphical display and user interface of an app for the wearable tracking device in accordance with one or more embodiments of the present invention.

FIGS. 11A-B are illustrations of a graphical display and user interface of an app for the wearable tracking device showing specific location and identification of other devices within a sensing radius in accordance with one or more embodiments of the present invention.

DETAILED DESCRIPTION

Figure 1:
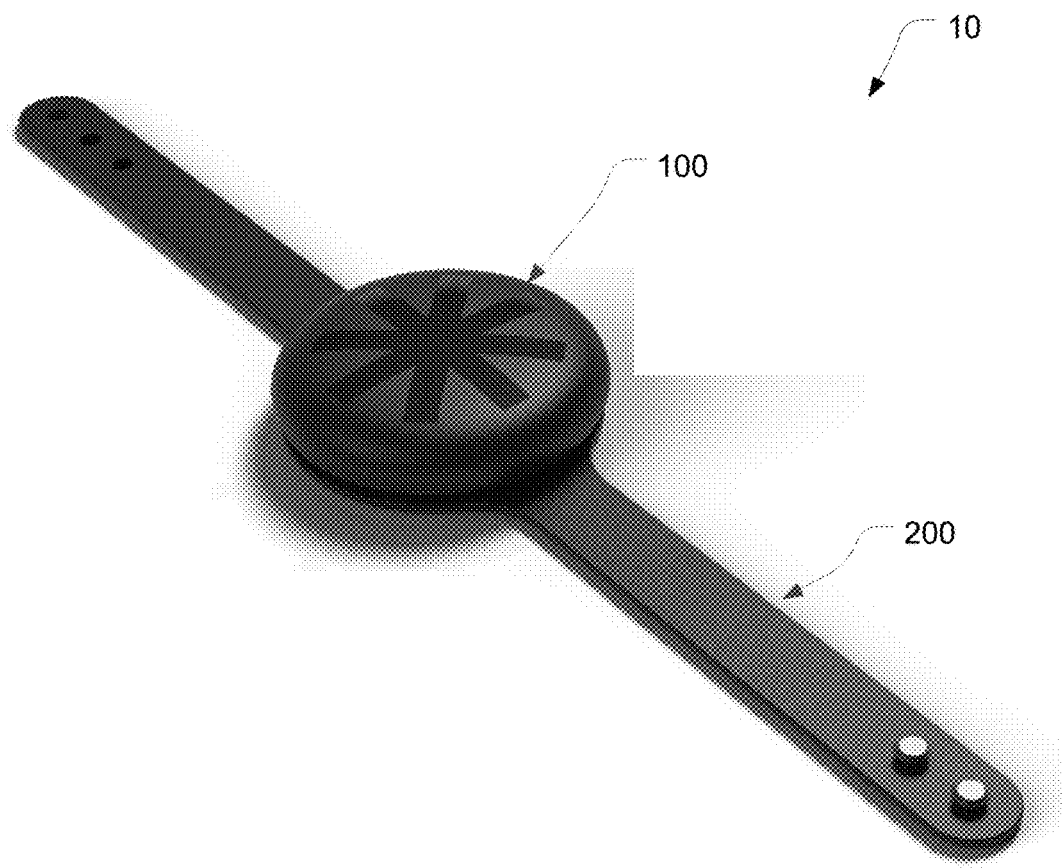
FIG. 1 is an illustration of the wearable tracking device (or smart band) in accordance with one or more embodiments of the present invention.
Figure 2:
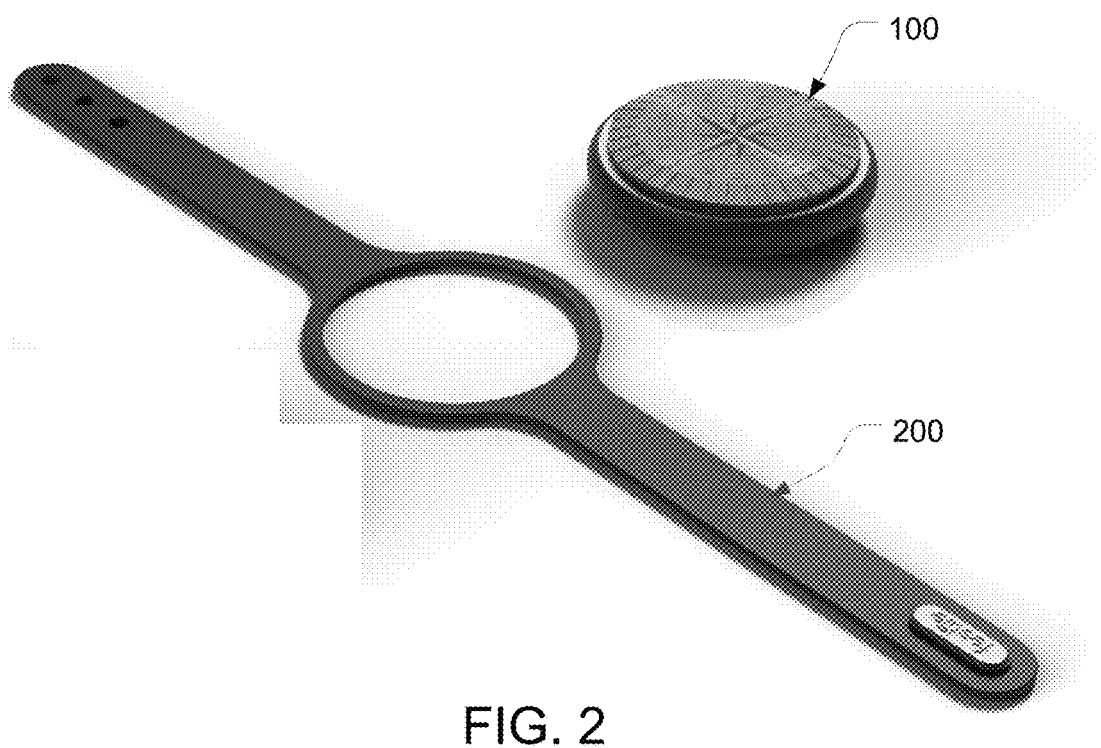
FIG. 2 is perspective view of the backside of the smart band separated from the wristband in accordance with one or more embodiments of the present invention.
Figure 3:
FIG. 3 is an illustration of the various components of the wearable tracking device in accordance with one or more embodiments of the present invention.

The present invention comprising a method and apparatus for location tracking and sharing of social media data will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting. One of ordinary skill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention. It should be noted that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term "first", "second" and the like, herein do not denote any order, quantity or importance, but rather are used to distinguish one element from another, and the terms "a" and "an" herein do not denote a limitation of quantity, but rather denote the presence of at least one of the referenced item.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

One or more embodiments of the invention relates to a wearable tracking device or smart band that can be used by a group of persons, e.g. friends and/or family, at a crowded event, e.g. a music festival/crowded event/theme park, to track each other's location thereby never losing each other even in places where there is no cell connection. For example, if a user would like to be found they are able to use the invention's "Find Me" feature to alert friends or family that they would like to be found. In one or more embodiments, the "Find Me" feature may be activated simply by turning on the device. A user that does not have a smart device, e.g. a smartphone or tablet, can still utilize the smart band with its compass to direct them to their friends and family.

In one or more embodiments, a user can connect with new friends at a festival, theme parks, leisure parks, cruises, crowded events, etc. simply by touching of smart bands together to transfer contact data and/or to make social media connection.

One or more embodiments of the present invention will now be described with references to FIGS. 1-13.

FIG. 1 is an illustration of the wearable smart band in accordance with one or more embodiments of the present invention. As illustrated, smart band 10 comprises a tracker 100 and wristband 200 coupled to tracker 100. The wristband comprises a strap hook 210 for securing the wristband to the person's wrist.

Figure 4:
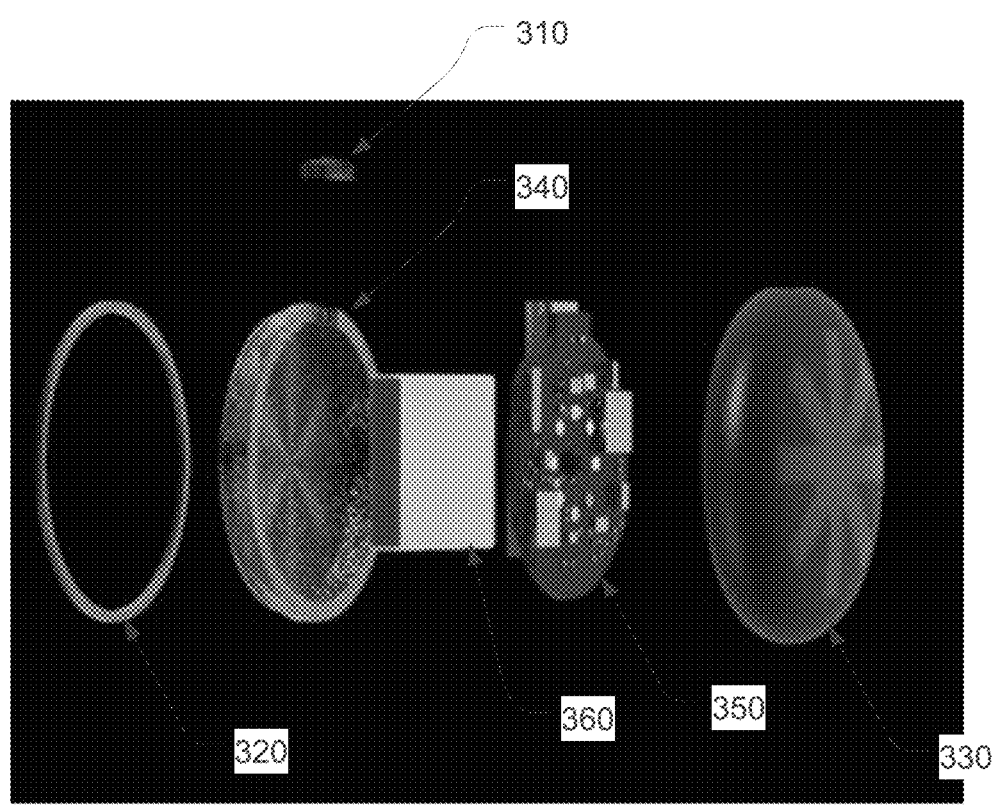
FIG. 4 is an exploded view of the various components of the tracker device in accordance with one or more embodiments of the present invention.

In one or more embodiments, the smart tracker 100 comprises a plurality of components that enables its functionality. FIG. 4 is an exploded view of the tracker 100 showing the various components in accordance with one or more embodiments of the present invention. As illustrated, the tracker comprises a main housing 330; a printed circuit board (PCB) assembly 350 that resides inside the main housing 330; a power pack (e.g. battery) 360; a chassis cover 340 for enclosing the battery and the PCB inside the housing 330; an assembly ring for securing the wristband to the tracker; and an optional USB door component 310 for covering the USB port 520 (FIG. 5B) when not in use.

Figure 5A:
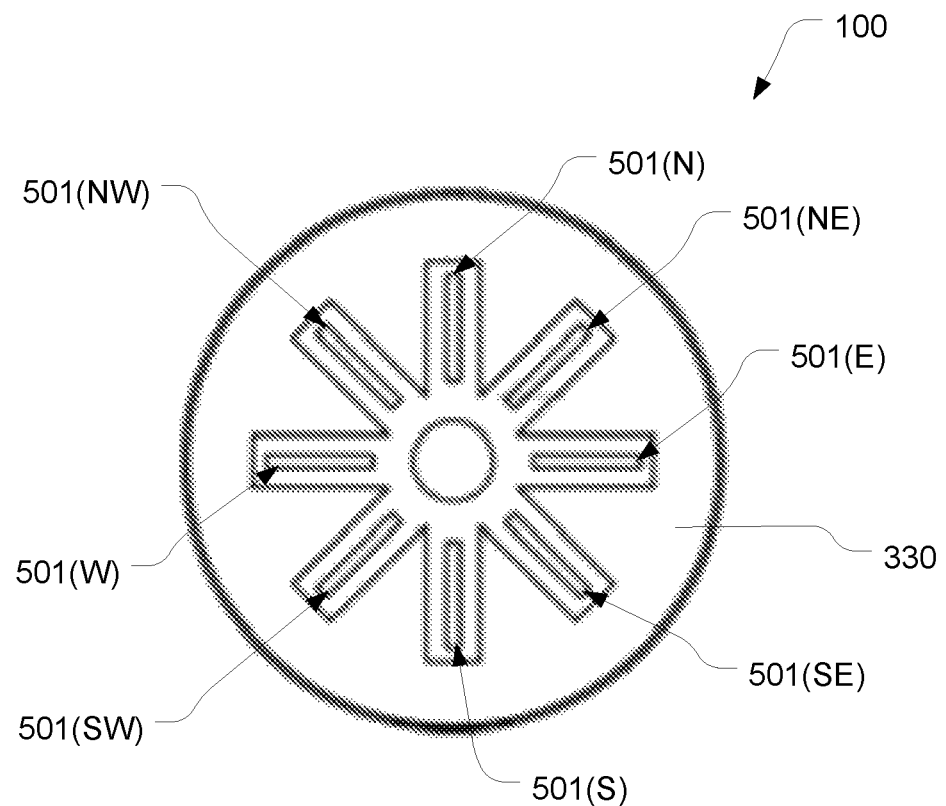
FIGS. 5A-B are illustrations of different views (A-top plan, B-side elevation) of the tracker device in accordance with one or more embodiments of the present invention.
Figure 5B:
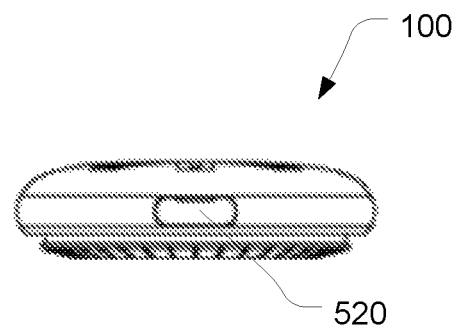

In one or more embodiments, tracker device 100 functions as an electronic compass thus the main housing 330 comprises a plurality of LED windows. FIGS. 5A-B are illustrations of different views (A-top plan, B-side elevation) of the tracker device 100 in accordance with one or more embodiments of the present invention. As illustrated, the main housing 330 comprises a plurality of LED windows 501(N), 501(NE), 501(E), 501(SE), 501(S), 501(SW), 501 (W), and 501(NW). The designations, (N), (NE), etc. signify the compass directions N for North, NE for Northeast, E for East, SE for Southeast, S for South, SW for Southwest, W for West, and NW for Northwest. Those of skill in the art would appreciate that other configurations for the display windows are contemplated. For instance, configurations with a single LED display may be used to allow for precise directional control instead of discrete directional guidance. Other embodiments, may use 4 or 16 LED windows depending on the desired precision of the navigational control guidance.

In one or more embodiments, these LED windows provide the guidance that a user of a first wearable smart band 10 needs to locate a second user of a wearable smart band 10. In one or more embodiments, the first user of wearable smart band 10 is able to simultaneously track a plurality of users with their respective smart band 10. For instance, the system may be configured to track from one to five other friends or any number of friend therebetween.

Figure 7:
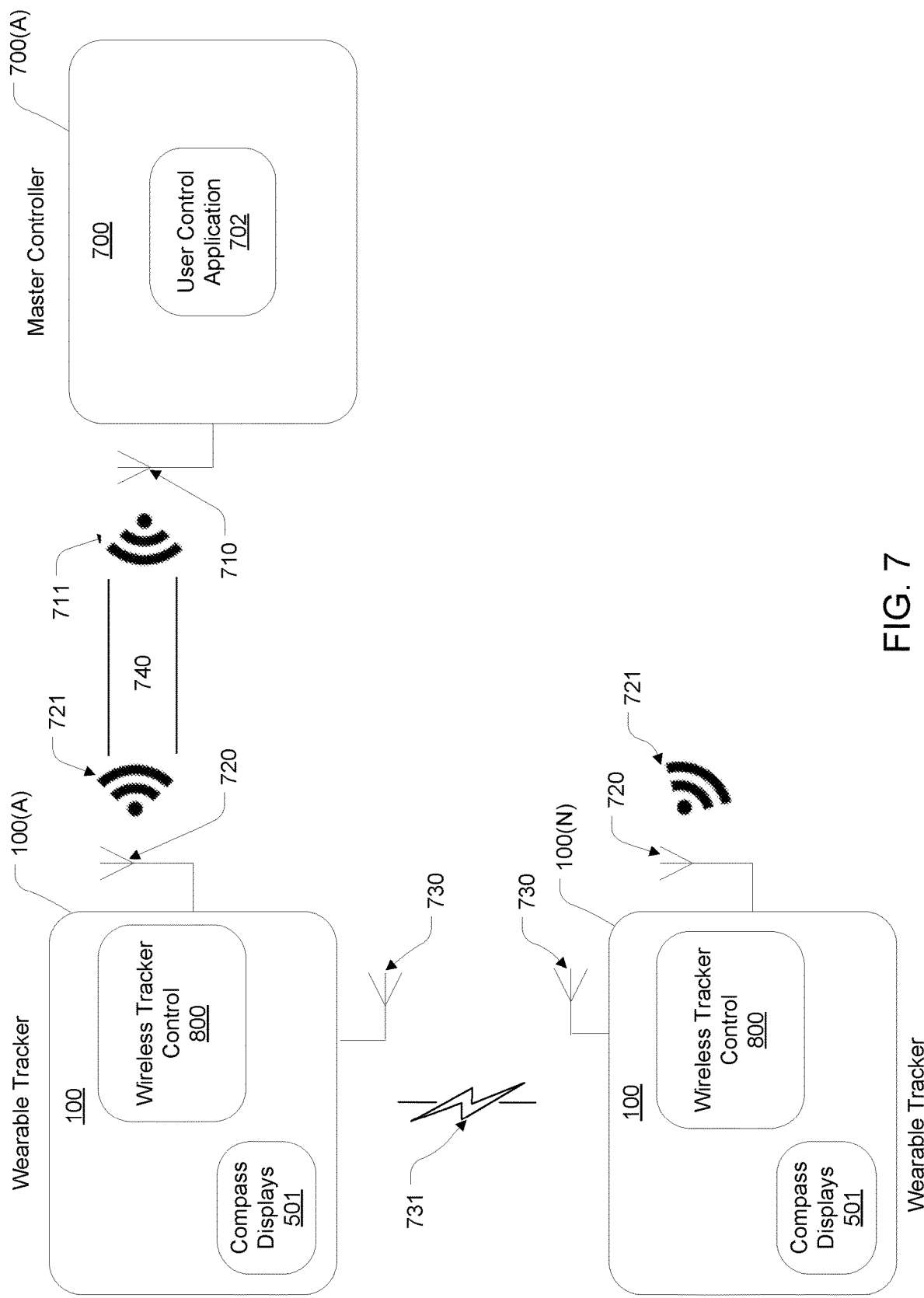
FIG. 7 is a functional level illustration of the wearable tracker control architecture in accordance with one or more embodiments of the present invention.

FIG. 7 is a functional level illustration of the wearable tracker control system architecture in accordance with one or more embodiments of the present invention. As illustrated, the system comprises one or more wearable trackers, e.g. 100(A) to 100(N), in wireless communication with each other via communication network 731. The wearable tracker, e.g. 100(A), of a first user in wireless communication with the first user's smart controller 700(A) e.g. via Bluetooth Low Energy (BLE) communication, the wearable tracker of user N, e.g. 100(N), may be in wireless communication with that user N's smart controller 700(N). The smart controller comprises a smart device, e.g. smartphone, tablet computer, etc. with a user control application ("App") 702 therein.

In one or more embodiments, each tracker operates in both listening mode and advertisement mode. In the tracker advertisement mode, each tracker broadcasts advertisements comprising a custom universally unique identifier (UUID). The custom UUID may comprise the tracker's operational status (e.g. battery life), location information (e.g. GPS coordinates), or a combinations thereof.

In the tracker listening mode, each tracker scans the appropriate frequencies and time slots for advertisements from one or more other trackers. Thus, each of the one or more trackers, during its listening mode, receives the broadcasts of a custom UUID from other trackers in the vicinity. The tracker updates its program memory with the data it received from each other tracker 100 for which it received a custom UUID.

Master controller 700 is preferably a smart device, i.e. an electronic device that can be connected to other devices or networks via different wireless protocols such as Bluetooth, NFC, Wi-Fi, etc., and that can operate to some extent interactively and autonomously (e.g. a smartphone, tablet computer, laptop, smart watches, smart bands, etc.). In one or more embodiments, master controller 700 comprises radio frequency communication capability, e.g. a Bluetooth Low Energy (BLE) radio for communication. The master controller is also capable of operating in both listening mode and advertisement mode. In the master controller advertisement mode, e.g. BLE peripheral mode, the master controller may broadcast its GPS coordinates to its corresponding tracker 100 using a custom UUID. In listening mode, the master controller, e.g. 700(A), may receive from its corresponding tracker, e.g. 100(A), the tracker's GPS coordinates and GPS coordinates of other trackers, e.g. 100(N), with which the tracker is in communication.

In one or more embodiments, the wearable tracker 100 comprises one or more compass displays 501; a wireless tracker control module 800; a wireless radio antenna 720 for communication with a smart controller, e.g. smartphone; and a private network antenna 730.

In one or more embodiments, a wearable tracker 100 uses the wireless radio antenna 720 to communicate with master controller 700. Master controller 700 comprises App 702 and antenna 710, which broadcasts wireless waves 711. Wearable tracker 100 uses antenna 720 to receive wireless waves 711 being broadcast by the master controller, e.g. 700 (A). In one or more embodiments, wireless waves 721 and 711 are BLE compatible radio waves.

In one or more embodiments, each wearable tracker, e.g. 100(A), is in wireless communication with one or more other wearable trackers, e.g. 100(N), that are connected to the private communication network 731. Private communication network 731 is preferably a LoRaWAN network, which is an open global standard for secure, carrier-grade IoT (Internet of Things) connectivity, or other suitable/similar network. Thus, the wearable trackers within the communication area are able to communicate with each other via the private communication network 731, e.g. LoRaWAN.

As illustrated, Master Controller 700 comprises Remote Control Application ("App") 702. Master Controller 700 is preferably a smart device, such as a smartphone, tablet, or any other smart device capable of radio communication. For instance, Master Controller 700 may be an iOS device from Apple, Inc., an Android device, etc. In a preferred embodiment, Master Controller 700 is Bluetooth Low Energy (BLE) enabled.

In one or more embodiments, the smart device 700 is Global Positioning System (GPS) enabled.

Figure 8A:
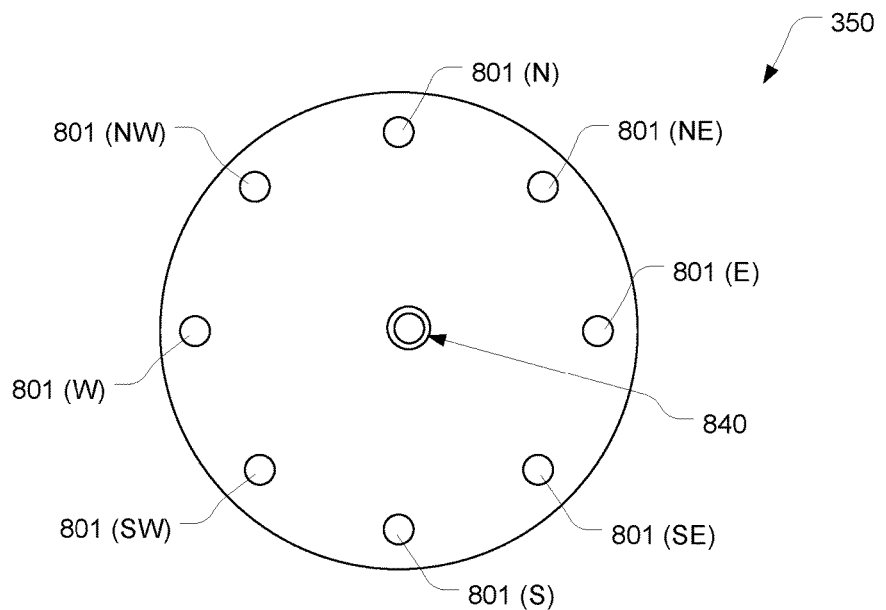
FIG. 8A is an illustration of the top face of the circuit board of the wearable tracker in accordance with one or more embodiments of the present invention.

FIG. 8A is an illustration of the top face of the circuit board 350 of the wearable tracker in accordance with one or more embodiments of the present invention. As illustrated, each tracker 100 may include an ON/OFF switch 840, and one or more displays, e.g. LEDs 801. The ON/OFF switch 840 may be activated/deactivated by pressing down or touching on the top of main housing 330. Switch 840 may be a capacitive touch switch or any other type of switch that provides the functionality for turning on/off the tracker 100.

Figure 8B:
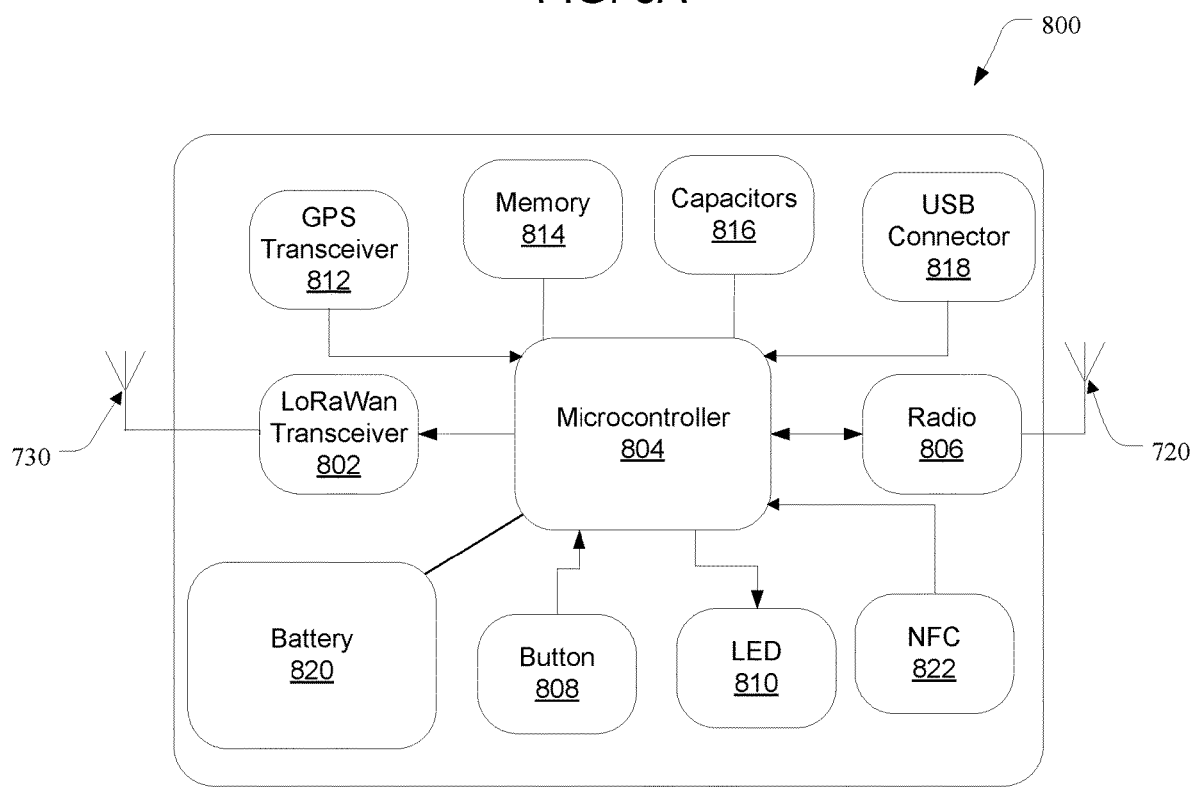
FIG. 8B is a functional level illustration of functional components of the wearable tracker control module in accordance with one or more embodiments of the present invention.

In one or more embodiments, operation of the tracker 100 may be controlled and monitored by wearable tracker control module 800 in the master controller. FIG. 8B is a functional level illustration of the components of the wearable tracker control module 800 in accordance with one or more embodiments of the present invention.

As illustrated, each tracker control module 800 comprises Microcontroller 804 coupled to Radio 806; LoRaWAN transceiver 802; power pack 820; Memory 814; capacitors 816; USB connector 818; Regulator 320; Button 808; GPS transceiver 812; Wireless Radio transceiver 806; Near-Field Communication ("NFC") 822; and LED control 810.

Wireless Radio 806 controls all wireless communications between tracker 100 and master controller 700. In one or more embodiments, in addition to other wireless communication modes, e.g. classic Bluetooth, Radio 806 further comprises Bluetooth Low Energy communication mode. Radio 806 may use BLE advertisement functionality for communicating the UUID of the tracker unit to the master controller. Each tracker may also be configured to communicate the UUID of one or more other trackers of which it is in communication to the master controller. In one or more embodiments, App 702 uses the UUID of the native tracker, i.e. its corresponding tracker, and the UUID of the one or more other trackers for display, as further discussed further below.

In one or more embodiments of the present invention, Radio 806 may be configured to use BLE listening mode for receiving GPS information from master controller 700. Thus, Radio 806 is capable of operating in BLE advertisement, BLE listening mode and any other desired RF communication modes.

In one or more embodiments, the tracker control module's microcontroller 804 and radio 806 comprises a CC2541 system-on-chip device which is combination of an 8051 microcontroller and BLE radio system. The CC2541 interacts with master controller 700 through a set of BLE profiles. The main function of device is a transfer of the tracker GPS coordinates through the BLE profiles or (when tracker disconnected from the master controller) through GPS receiver 812. The GPS coordinates are transferred between trackers through the low power wide area radio interface (LoRaWan 802). In one or more embodiments, a tracker advertises its GPS coordinates periodically, e.g. at predetermined time intervals (in seconds). In one or more embodiments, the predetermined time interval is controllable by the master controller via the BLE link 740. For example, the time interval could be 0.01 s, 0.02 s, 0.05 s, 0.1 s, 0.2 s, 0.5 s, 1 s, 2 s, 5 s, 10 s, 15 s, 20 s, 25 s, 30 s or ranges including and/or spanning the aforementioned values.

In one or more embodiments, when a tracker 100 is activated (e.g. via button 840 or via App 702), the tracker starts to listen for packets from other trackers in the communication network. In one or more embodiments, a user may implement a whitelist comprising other users with which they want to keep in contact with during an event. A tracker device may be added to the whitelist through one of many possible interfaces, e.g. through App 702, by direct login into a user's account and editing the whitelist on the system server, or by touching user devices.

In one or more embodiments, the user interface with the tracker 100 comprises LED control 810 and Button control 808. The LED control 810 is used to control LEDs 801(N), 801(NE), 801(E), 801(SE), 801(S), 801(SW), 801(W), and 801(NW). The designations, (N), (NE), etc. signify the compass directions N for North, NE for Northeast, E for East, SE for Southeast, S for South, SW for Southwest, W for West, and NW for Northwest. The LEDs provide directional guidance to a destination of a monitored user. In one or more embodiments, the LEDs and windows of the main housing are configured such that LED 801(N) illuminates window 501(N); LED 801(NE) illuminates window 501(NE); LED 801(E) illuminates window 501(E); LED 801(SE) illuminates window 501(SE); LED 801(S) illuminates window 501(S); LED 801(SW) illuminates window 501(SW); LED 801(W) illuminates window 501(W); and LED 801(NW) illuminates window 501(NW).

In one or more embodiments, Button 808 may be configured to enable/disable the scan functionality for other devices, to power on and off device, etc.

The power system for the tracker is a combination of Li-polymer charger (not shown) which charges battery pack 820 via USB port 818. Voltage from battery 820 is provided to rest of components in the control module 800.

Capacitors 816 may be configured to supply power to the tracker control module electronics to retain its configuration settings in sleep mode while the batteries are removed for less than a specified period of time, e.g. one minute.

A 9-axis IMU (Inertial Measurement Unit) function in the tracker control module 800 uses the internal GPS coordinates to determine a direction to another user. The IMU function may reside in system memory 814, for example. The IMU function may comprise computer readable program configured to perform the standard 9-axis IMU function.

As illustrated in FIG. 7, each tracker 100 may communicate via a wireless radio link 740 with remote master controller 700. Thus, each tracker is capable of broadcasting its status and configuration via wireless broadcast 721 and each master controller broadcasts its advertisements through wireless broadcast 711. In BLE, the only broadcast messages are advertisements. Thus, in one or more embodiments, both the tracker 100 and the master controller 700 are BLE enabled devices that are capable of broadcasting and listening for broadcast messages. That is, each device acts both as a broadcaster and an observer. Application 702 uses BLE advertisement functionality for transmitting GPS coordinate information to the corresponding tracker unit 100.

In one or more embodiments of the present invention, App 702 uses BLE listening mode for checking status of each tracker. Thus, master controller 700 is capable of operating in BLE advertisement, BLE listening mode and any other desired RF communication modes. Master controller 700 comprises a radio (e.g. communication interface 740) that includes support for simultaneous operation as a BLE peripheral and a BLE observer. Those of skill in the arts would appreciate that Master controller 700 is not limited to the communication modes described herein, that other communication modes are possible and contemplated.

In one or more embodiments, master controller 700 comprises a user interface for controlling the tracker and to enable other functionalities of the present invention. For instance, master controller 700 may provide an interface to the user through remote control application 702 with which the user can configure the operation of the system and to provide guidance and tracking information to other trackers in the private network antenna 730.

In one or more embodiments, a user can connect with new friends at a festival, theme parks, leisure parks, cruises, crowded events, etc. simply by touching of smart bands together thereby transferring contact data and/or making social media connection. The transfer of contact information or social media connection may be made possible via NFC 822. Near-field communication enables two smart bands 100 to establish communication by bringing them within 4 cm of each other, e.g. by having the smart bands make contact with one another. Thus, by touching together of smart bands, a user can add friends to his/her contacts.

FIGS. 9A-C are exemplary illustrations of a login user interface, i.e. 900A (FIG. 9A,), 900B (FIG. 9B), and 900C (FIG. 9C), of an app for the wearable tracking device in accordance with one or more embodiments of the present invention. As illustrated in FIG. 9A, a user may log into the App 702 by entering their user ID, e.g. email address, in field 902 and password in field 904. The user may then select the "Login" button to verify and log into the App 702.

In one or more embodiments, after the user is verify and logged into the system, the master controller 700 goes into the listening mode to search for the tracker device 100. Textual information field 910 provides the connection status. Thus, as illustrated in FIG. 9B, the message "Looking for Festiie Device" indicates that connection has not been accomplished and the master controller is waiting to complete the connection. Finally, when connection is established with the tracker 100, the textual information field 910 changes its message to "Connected", as illustrated in FIG. 9C. Back button 906 is provided to revert to the previous page. In one or more embodiments, a graphical information display 920 is also provided. As illustrated, the graphical information display is empty when the connection is not established (FIG. 9B), and filled when connection is established (FIG. 9C).

In one or more embodiments, after connection is established, a display of the user's location on a map is provided on the master controller device. FIGS. 10A-B are exemplary illustrations of location identification graphical display and user interface, i.e. 1000A (FIG. 10A), and 1000B (FIG. 10B), of an app for the wearable tracking device in accordance with one or more embodiments of the present invention. As illustrated in FIG. 10A, the user's location 1012 is identified on the map. Also, a textual readout 1013 of the user's location, e.g. "Coachella Valley Indio CA" may also be provided.

In one or more embodiments, the map display shows the user location 1012, and the one or more locations 1040 of members in the user's whitelist, as illustrated in FIG. 10B. The graphical display also includes a menu button 1004 for accessing various functions, e.g. Settings, battery Power, Signal Strength, "Find Your Friends", etc. and an expand/collapse button 1007 for information field 1006. In the collapsed mode, the information field 1006 provides very limited information, as illustrated in FIG. 10A. In the expanded mode, the information field 1006 provides information about the user's friends, as illustrated in FIG. 10B. The information may include initials, e.g. "DB" (i.e. 1030 (A)) and "DS" (i.e. 1030(B)), and their respective distance from the user, e.g. 50 ft for DB (i.e. 1031(A)) and 75 ft for DS (i.e. 1031(B)), etc. The graphical display panel 1002 includes a symbol 1040 to identify the location of each friend.

In one or more embodiments, after the friends are identified on the graphical display, the user can select which friend to track, e.g. by selecting "DB" at 1030(A), see FIG. 11A. FIGS. 11A-B are exemplary illustrations of a graphical display and user interface, i.e. 1100A (FIG. 11A), and 1100B (FIG. 11B), of an app for the wearable tracking device showing specific location and identification of other devices within a sensing radius in accordance with one or more embodiments of the present invention. As illustrated in FIG. 11A, once the friend to track is selected, e.g. "DB", the icon for the friend on the information field 1006 is highlighted, and the symbol 1040(DB) on the map is also highlighted.

In one or more embodiments, after the friend DB is selected, the graphical user interface changes as illustrated in FIG. 11B. In the example, the selected friend "DB" is Desmond Beristain, who is 50 ft away from the user 1012. That information may be displayed on the information field 1006, as illustrated. A button "View profile" 1110 for access to DB's profile information may be provided, and one or more action buttons may also be provided, e.g. "Message" 1112, to send a message to Desmond Beristain and "Locate" 1114 to guide the user to Desmond Beristain.

Figure 12B:
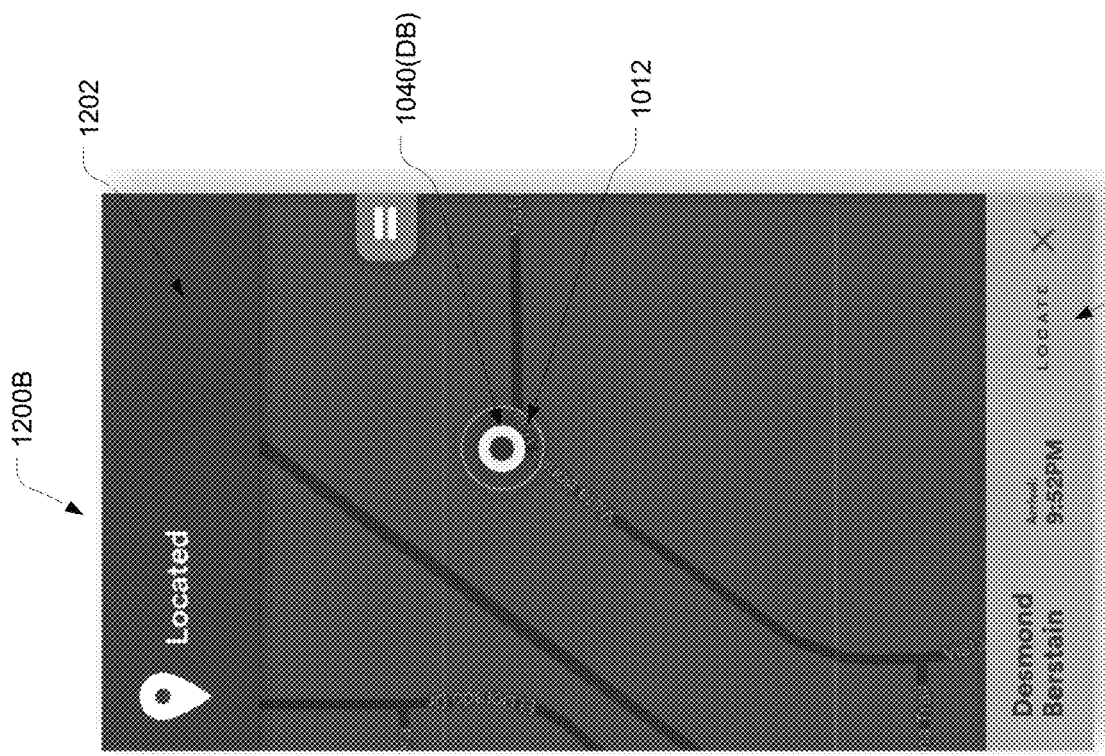
FIGS. 12A-B are illustrations of a graphical display and user interface of an app for the wearable tracking device showing guidance to a selected devices location in accordance with one or more embodiments of the present invention.
Figure 12A:
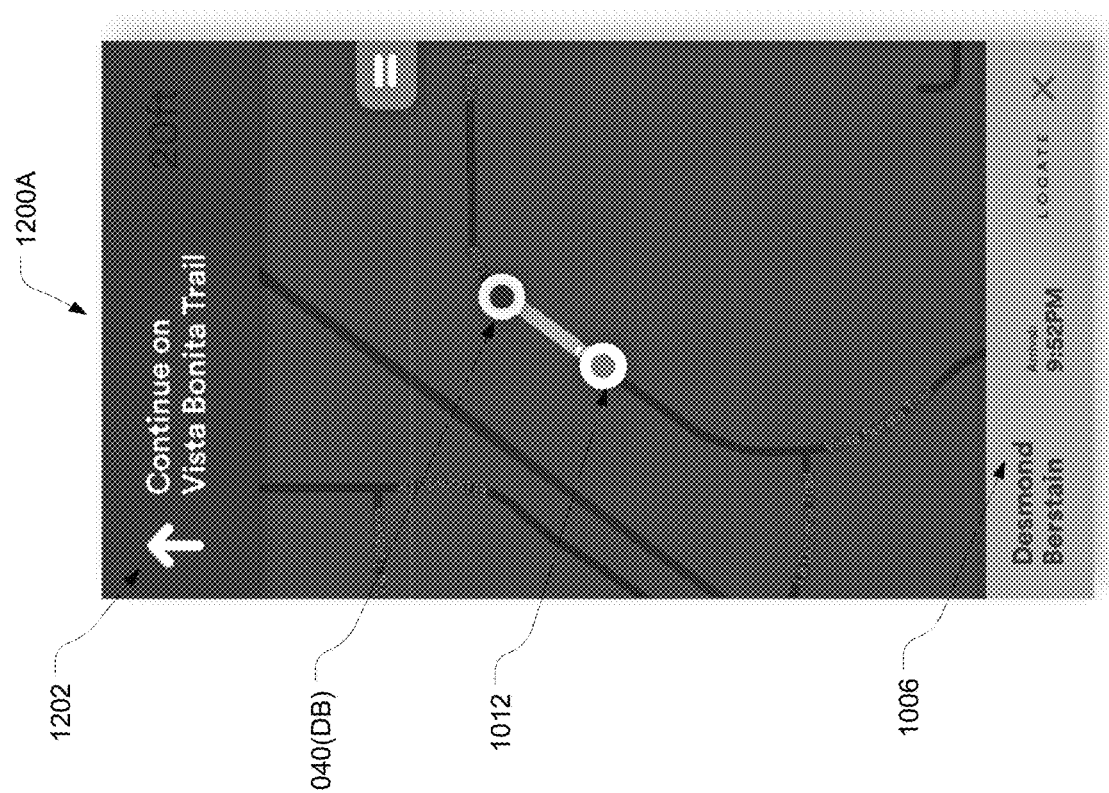

If the user selects "Locate", GPS guidance is provided to 1040(DB). FIGS. 12A-B are exemplary illustrations of a graphical display and user interface, i.e. 1200A (FIG. 12A), and 1200B (FIG. 12B), of an app for the wearable tracking device showing guidance to a selected devices location in accordance with one or more embodiments of the present invention. As illustrated, navigation information is provided on the master controller display to guide the user 1012 to Desmond Beristain at 1040(DB). The information field 1006 may change to display time of arrival at 1040(DB) and the function being performed, i.e. "Locate."

In one or more embodiments, the appropriate LED windows, e.g. 501(N), 501(NE), 501(E), 501(SE), 501(S), 501 (SW), 501(W), and 501(NW), on the smart band (tracker) illuminates to provide directional guidance to user 1012.

Figure 13:
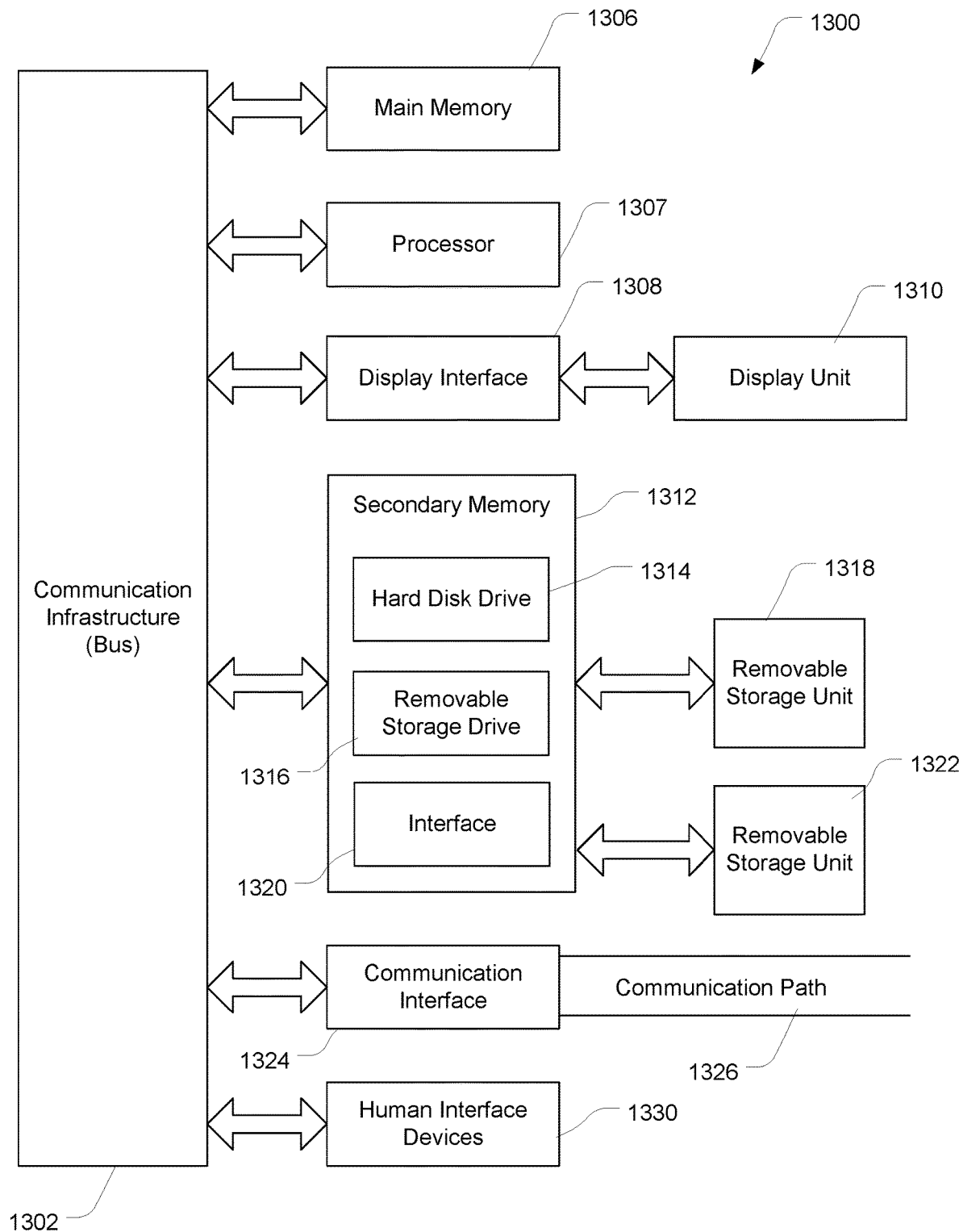
FIG. 13 illustrates a computer and peripherals that when programmed as described herein may operate as a specially programmed computer capable of implementing one or more methods, apparatus and/or systems of the present invention.

FIG. 13 is an illustration of a computer 1300, which when programmed as described herein, may operate as a specially programmed computer capable of implementing one or more methods, apparatus and/or systems of the solution described in this disclosure. Processor 1307 may be coupled to bi-directional communication infrastructure 1302 such as communication infrastructure system bus 1302. Communication infrastructure 1302 may generally be a system bus that provides an interface to the other components in the general-purpose computer system such as processor 1307, main memory 1306, display interface 1308, secondary memory 1312 and/or communication interface 1324.

Main memory 1306 may provide a computer readable medium for accessing and executing stored data and applications. Display interface 1308 may communicate with display unit 1310 that may be utilized to display outputs to the user of the specially-programmed computer system. Display unit 1310 may comprise one or more monitors that may visually depict aspects of the computer program to the user. Main memory 1306 and display interface 1308 may be coupled to communication infrastructure 1302, which may serve as the interface point to secondary memory 1312 and communication interface 1324. Secondary memory 1312 may provide additional memory resources beyond main memory 1306, and may generally function as a storage location for computer programs to be executed by processor 1307. Either fixed or removable computer-readable media may serve as secondary memory 1312. Secondary memory 1312 may comprise, for example, hard disk 1314 and removable storage drive 1316 that may have an associated removable storage unit 1318. There may be multiple sources of secondary memory 1312 and systems implementing the solutions described in this disclosure may be configured as needed to support the data storage requirements of the user and the methods described herein. Secondary memory 1312 may also comprise interface 1320 that serves as an interface point to additional storage such as removable storage unit 1322. Numerous types of data storage devices may serve as repositories for data utilized by the specially programmed computer system. For example, magnetic, optical or magnetic-optical storage systems, or any other available mass storage technology that provides a repository for digital information may be used.

Communication interface 1324 may be coupled to communication infrastructure 1302 and may serve as a conduit for data destined for or received from communication path 1326. A network interface card (NIC) is an example of the type of device that once coupled to communication infrastructure 1302 may provide a mechanism for transporting data to communication path 1326. Computer networks such Local Area Networks (LAN), Wide Area Networks (WAN), Wireless networks, optical networks, distributed networks, the Internet or any combination thereof are some examples of the type of communication paths that may be utilized by the specially programmed computer system. A Bluetooth Low Energy radio is another example of the type of device that may be coupled to communication infrastructure 1302 to provide a mechanism for transporting data to communication path 1326 when device 1300 is used as the smart device, e.g. smartphone or tablet computer. Communication path 1326 may comprise any type of wireless network or interconnection fabric that can transport data to and from communication interface 1324. In a preferred embodiment, the interconnection fabric is BLE compatible radio waves.

To facilitate user interaction with the specially programmed computer system, one or more human interface devices (HID) 1330 may be provided. Some examples of HIDs that enable users to input commands or data to the specially programmed computer may comprise a keyboard, mouse, touch screen devices, microphones or other audio interface devices, motion sensors or the like, as well as any other device able to accept any kind of human input and in turn communicate that input to processor 1307 to trigger one or more responses from the specially programmed computer are within the scope of the system disclosed herein.

While FIG. 13 depicts a physical device, the scope of the system may also encompass a virtual device, virtual machine or simulator embodied in one or more computer programs executing on a computer or computer system and acting or providing a computer system environment compatible with the methods and processes of this disclosure. In one or more embodiments, the system may also encompass a cloud computing system or any other system where shared resources, such as hardware, applications, data, or any other resources are made available on demand over the Internet or any other network. In one or more embodiments, the system may also encompass parallel systems, multi-processor systems, multi-core processors, and/or any combination thereof. Where a virtual machine performs substantially similarly to that of a physical computer system, such a virtual platform will also fall within the scope of disclosure provided herein, notwithstanding the description herein of a physical system such as that in FIG. 13.

One or more embodiments of the present invention is configured to handle several thousand users within the range of the LoRanWan private network 731. The system has available 104 channels for communication and uses TDMA (Time Division Multiple Access). Thus, up to 104 users may be assigned in each time slot. The system server is configured to allocate time slots based on regions or zones. As users enter these regions, they are assigned a unique time slot and channel. Each user's clock will be synchronized using the onboard GPS clock. In a preferred embodiment, synchronization is minimized to preserve battery life. However, depending on the GPS Time To First Fix (TTFF) (currently estimated at 5-7 minutes), it may be necessary to turn on the GPS X seconds/minutes in advance, where X is equal to TTFF.

Figure 6:
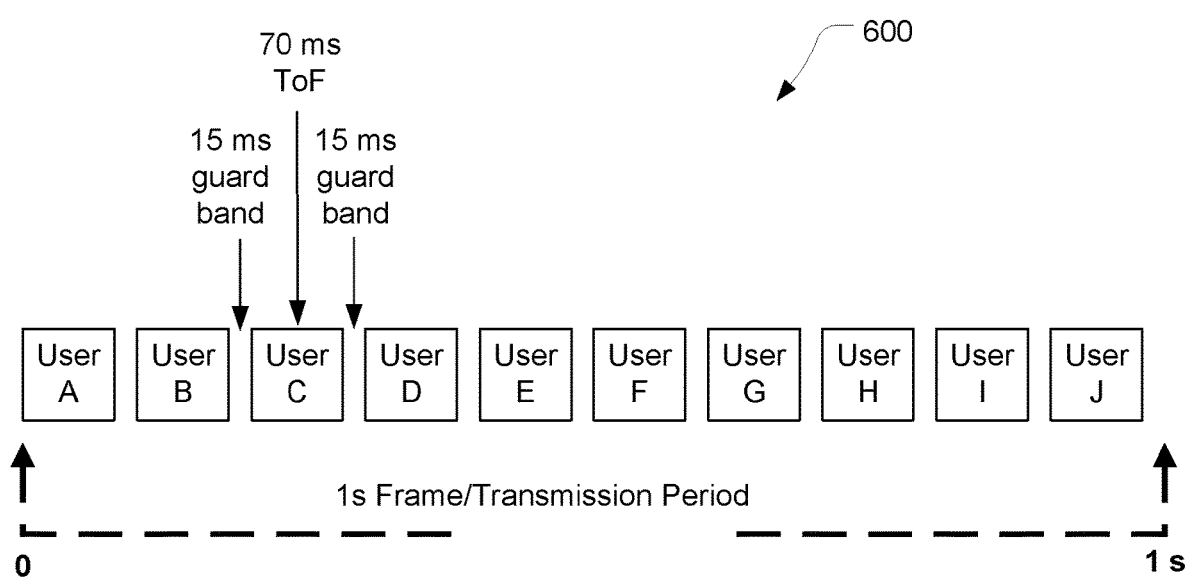
FIG. 6 is an illustration of allocation of timeslots in a one-second frame transmission period for users in accordance with one or more embodiments of the present invention.

The accuracy of the GPS clock range between 1 microsecond to a few milliseconds. Each user's tracker 100 transmits in its pre-assigned time slot and channel, with a guard band before and after for further collision prevention. FIG. 6 an illustration of allocation of timeslots in a one-second frame transmission period 600 for users in accordance with one or more embodiments of the present invention. As illustrated, up to 10 users, e.g. User A to User J, with a time-of-flight (ToF) of 70 milliseconds may be allocated for each 1 second transmission period with a guard band of 15-30 milliseconds between.

In one or more embodiments, the system server lives on a Cloud and is configured with software to assign out a unique time slot and channel combination after a user registers their account. If a user enters a different zone, the server deallocates their current time slot and channel from the previous zone and assigns an available time slot and channel in the new zone. The server keeps track of every user's time slot and channel, as well as every zone's available time slots and channels in a database.

Because there are limited time slots available, there is a user cap for each zone. For example, if a 16-byte packet allows for approximately 20,000 max users, then each zone can only have up to 20,000 users at any given time. In one or more embodiments, to increase the number of users, the system may monitor active and non-active users, and reassign the time slot and channel of the non-active users. Once the non-active users become active again, the system can assign them new channels if available. Thus, ensuring that no time slot and/or channel is being wasted.

Since GPS tends to drain battery life rapidly, a balance is struck where the tracker's onboard GPS 812 is not used often. Thus, in one or more embodiments, a user's time slot in their LoRa transmission is passed to their friends, e.g. in the whitelist, so everyone knows when everyone else is transmitting. In such configuration, the user only needs to scan during the times his/her whitelisted friends are transmitting.

While the invention herein disclosed has been described by means of specific embodiments and applications thereof, numerous modifications and variations could be made thereto by those skilled in the art without departing from the scope of the invention set forth in the claims.

What is claimed is:

1. A system for tracking comprising:
   a tracker comprising
      a housing with a plurality of directional windows;
      a plurality of LED light sources, wherein at least one of said plurality of LED light sources is configured for illuminating each of said plurality of directional windows;
      a GPS transceiver providing local GPS coordinates;
      a private network transceiver for communicating with one or more other trackers to exchange information comprising GPS coordinates;
      a radio transceiver for communication with a master controller, wherein said radio transceiver is configured to broadcast a custom universally unique identifier (UUID) within a pre-allocated channel and unique timeslot, wherein allocation of the channel and unique timeslot is controlled by an external server, wherein the custom UUID comprises one or more of the tracker's operational status, the local GPS coordinates and foreign GPS coordinates of the one or more other trackers; and a microcontroller, wherein the microcontroller executes stored programmed code for navigation guidance to at least one of said one or more other trackers using said local GPS coordinates and said plurality of directional windows, wherein the microcontroller causes an appropriate one of the plurality of directional windows to illuminate thereby providing directional navigation guidance to a selected one of the one or more other trackers; and a wristband coupled to the tracker.

2. The system of claim 1, wherein the master controller comprises an application software implemented in a smart device, and wherein the tracker communicates with said master controller using said radio transceiver.

3. The system of claim 2, wherein the master controller is configured to provide graphical map display indicating said tracker and said one or more other trackers.

4. The system of claim 3, wherein the master controller is configured for identifying the selected one of the one or more other trackers.

5. The system of claim 1, wherein the radio transceiver is Bluetooth Low Energy ("BLE") transceiver.

6. The system of claim 1, wherein the external server is in communication with the master controller.

7. The system of claim 1, wherein the plurality of directional windows comprises North, Northeast, East, Southeast, South, Southwest, West, and Northwest.

8. The system of claim 1, wherein the master controller is a smartphone.

9. The system of claim 1, wherein the tracker further comprises a near field communication.

10. The system of claim 1, wherein said radio transceiver is further configured to receive broadcasts of a foreign custom UUID from each of the one or more other trackers.

11. A system for tracking comprising:

a computer server;

a plurality of master controllers in communication with said computer server; and a plurality of trackers in wireless communication with said plurality master controllers, wherein each one of said plurality of master controllers has a corresponding local tracker from said plurality of trackers, wherein each of said plurality of trackers comprises:

a housing with a plurality of directional windows;

a plurality of LED light sources, wherein at least one of said plurality of LED light sources is configured for illuminating each of said plurality of directional windows;

a GPS transceiver providing local GPS coordinates;

a private network transceiver for communicating with one or more other trackers of said plurality of trackers to exchange information comprising GPS coordinates;

a radio transceiver for communication with its corresponding master controller, wherein said radio transceiver is configured to broadcast a custom universally unique identifier (UUID) within a pre-allocated channel and unique timeslot, wherein allocation of the channel and unique timeslot is controlled by the computer server, wherein the custom UUID comprises one or more of the tracker's operational status, the local GPS coordinates and foreign GPS coordinates of the one or more other trackers; and a microcontroller, wherein the microcontroller executes stored programmed code for navigation guidance to at least one of said one or more other trackers using said local GPS coordinates and said plurality of directional windows, wherein the microcontroller causes an appropriate one of the plurality of directional windows to illuminate thereby providing directional navigation guidance to a selected one of the one or more other trackers.

12. The system of claim 11, wherein the master controller is configured to provide graphical map display indicating said local tracker and said one or more other trackers.

13. The system of claim 11, wherein the radio transceiver is Bluetooth Low Energy ("BLE") transceiver.

14. The system of claim 11, wherein the plurality of directional windows comprises North, Northeast, East, Southeast, South, Southwest, West, and Northwest.

15. The system of claim 11, wherein the master controller is configured for identifying the selected one of the one or more other trackers.

16. The system of claim 11, wherein at least one of the plurality of master controllers is a smartphone.

17. The system of claim 11, wherein each of the plurality of trackers further comprises a near field communication for transferring social media information between trackers.

18. The system of claim 11, wherein said radio transceiver is further configured to receive broadcasts of a foreign custom UUID from each of the one or more other trackers.

19. A wearable tracker comprising:

a housing enclosure with a plurality of directional windows on a top face of the housing enclosure;

a plurality of LED light sources within said housing enclosure, wherein at least one of said plurality of LED light sources is configured for illuminating each of said plurality of directional windows;

a GPS transceiver within said housing enclosure for providing local GPS coordinates;

a private network transceiver within said housing enclosure for communicating with one or more other trackers to exchange information comprising GPS coordinates;

a radio transceiver within said housing enclosure, wherein said radio transceiver is configured to operate in an advertising mode and a listening mode, wherein in said advertising mode said radio transceiver broadcasts a custom universally unique identifier (UUID) within a pre-allocated channel and unique timeslot, wherein allocation of the channel and unique timeslot is controlled by an external server, wherein the custom UUID comprises one or more of operational status, the local GPS coordinates and foreign GPS coordinates of the one or more other trackers, wherein in said listening mode said radio transceiver receives broadcasts of a foreign custom UUID from each of the one or more other trackers; and a microcontroller within said housing enclosure, wherein the microcontroller is configured to execute stored programmed code for navigation guidance to at least one of said one or more other trackers using said local GPS coordinates and said plurality of directional windows, wherein the microcontroller causes an appropriate one of the plurality of directional windows to illuminate thereby providing directional navigation guidance to a selected one of the one or more other trackers; and a wristband coupled externally to the housing enclosure.

20. The wearable tracker of claim 19, further comprising near field communication within the housing enclosure.

\* \* \* \* \*